(12) United States Patent
Rickard et al.

(10) Patent No.: US 7,389,055 B1
(45) Date of Patent: Jun. 17, 2008

(54) DQPSK RECEIVER PHASE CONTROL

(75) Inventors: Robin Rickard, Harlow (GB); Hual Kee, Old Harlow (GB); Alan Robinson, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 548 days.

(21) Appl. No.: 11/082,999

(22) Filed: Mar. 17, 2005

(51) Int. Cl.
*H04B 10/06* (2006.01)

(52) U.S. Cl. ............... 398/206; 398/77; 398/209

(58) Field of Classification Search .......... 398/161, 398/207, 211, 214
See application file for complete search history.

(56) References Cited

U.S. PATENT DOCUMENTS

| 6,097,768 | A | 8/2000 | Janesch et al. |
| 6,590,860 | B1* | 7/2003 | Sakoda et al. ............... 370/203 |
| 2001/0031024 | A1* | 10/2001 | Petersen et al. ............ 375/335 |
| 2004/0081470 | A1 | 4/2004 | Griffin |
| 2004/0141222 | A1 | 7/2004 | Miyazaki et al. |
| 2005/0111855 | A1* | 5/2005 | Bissessur .................... 398/188 |
| 2005/0286911 | A1* | 12/2005 | Doerr et al. ................ 398/214 |
| 2006/0067703 | A1* | 3/2006 | Haunstein et al. .......... 398/161 |

* cited by examiner

*Primary Examiner*—Dzung D Tran
(74) *Attorney, Agent, or Firm*—Barnes & Thornburg

(57) ABSTRACT

An optical receiver for receiving an optical differential phase shift keyed signal has an optical component sensitive to the optical phase of the signal, such as an interferometer, a device arranged to generate a control signal by non linear limiting of an output of the optical component, such as an RF amplifier arranged to operate in a region near saturation point, and a phase controller for tuning a phase response of the optical component to the received signal according to the control signal.

11 Claims, 5 Drawing Sheets

FIG 7
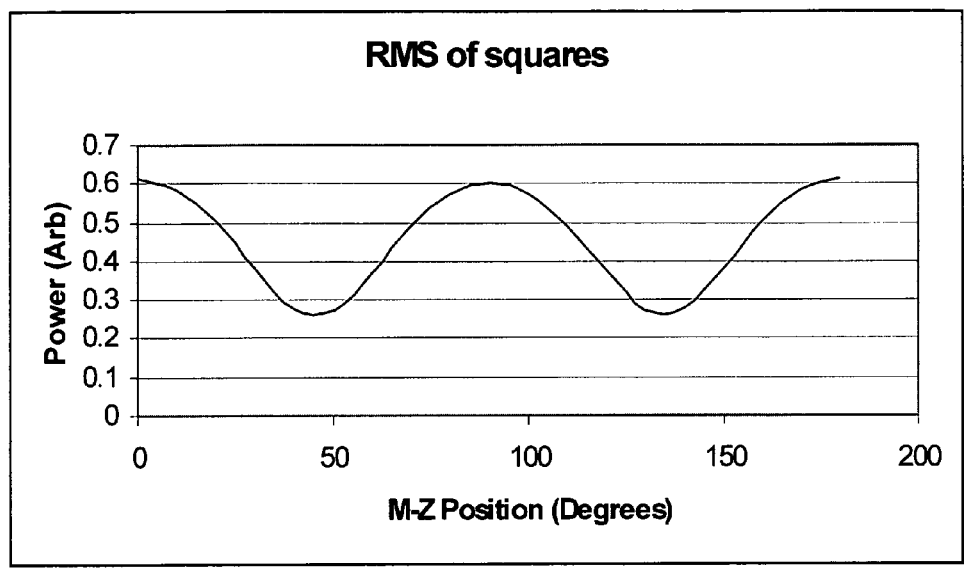
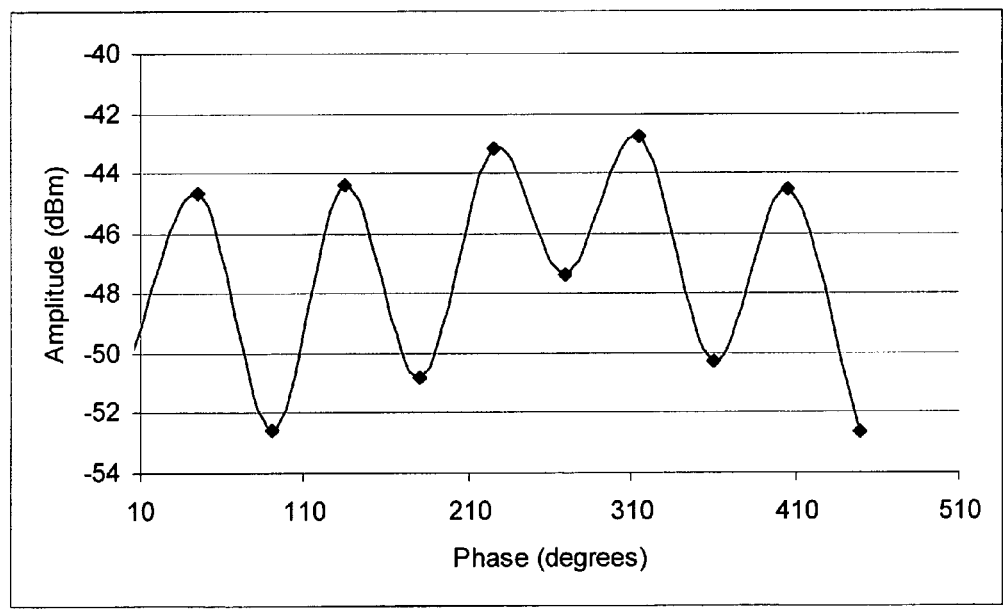
FIG 8

DQPSK RECEIVER PHASE CONTROL

FIELD OF THE INVENTION

This invention relates to receivers for optical differential phase shift keyed transmission systems, to methods of receiving, and to methods of offering a transmission service over such apparatus.

BACKGROUND TO THE INVENTION

It is known to provide a receiver for an optical transmission system which converts an optical signal to electrical form, then samples the signal to detect digital ones and zeroes for example. Such sampling requires an amplitude threshold to be set, and a clock phase to be set. This usually involves providing a clock recovery circuit for determining and continually adjusting the timing of the sampling. Such clock recovery circuits typically use a phase locked loop controlled in association with the threshold level to maximize an "eye opening" of the received waveform.

There are various ways of modulating the data at the transmitter and demodulating at the receiver, most based on altering phase or amplitude. Quadriphase or quadrature phase shift keying (QPSK) is a technique of phase modulating digital information onto a carrier signal. QPSK communications systems are generally known in the art. In these systems, a transmission unit uses a local reference oscillator to generate a carrier wave. This oscillator in the transmitter determines the frequency and phase of the unmodulated carrier wave. The transmitter encodes two bits of digital information on the carrier by shifting the carrier phase by a multiple of 90° for an interval of time of length T. The four possible phase shifts, or symbols, that can be transmitted during this interval are determined by the four possible combinations of the two bits to be transmitted. One symbol (two bits of information) is transmitted during each time interval, so the rate of transfer of data in the system is two bits per symbol interval T. On the other end of this system, a receiving unit decodes the two transmitted bits by measuring the phase shift between the received signal and a local reference oscillator.

A drawback to this system is the requirement that the receiver must have a reference oscillator matched in phase to the transmitter oscillator; that is, the decoding is done by coherent detection. This requirement is relaxed in the technique of differential QPSK (DQPSK). In DQPSK, the transmitted data are differentially encoded, that is, they are represented by the difference in phase between successive symbols. In this technique, the receiver does not need the absolute phase of the transmitter oscillator to decode the transmitted symbols. Instead, the decoding of the symbols is by differentially coherent detection: the receiver measures the phase difference between two successive received symbols. This measurement yields a number with four possible values (0 degrees, 90 degrees, 180 degrees, 270 degrees) that represents the two bits of transmitted data.

To demodulate the received signal, it is conventionally desirable for the DQPSK receiver to have a local oscillator that reconstructs the carrier wave. This oscillator in the receiver must match the frequency (although not necessarily the phase) of the DQPSK transmitter oscillator that generated the carrier wave. If the frequencies of the two oscillators are not matched, the receiver cannot efficiently demodulate the transmitted data. The receiver oscillator can be built so that its natural frequency is close to that of the transmitter, but due to variations in manufacturing and differences in operating environments, there will be drifts between the two oscillators. To compensate for such offsets in frequency between the carrier wave and the receiver oscillator, the receiver oscillator can be locked to the carrier wave by a phase-locked loop (PLL). Such a carrier-recovery mechanism can serve to tie the frequency of the receiver oscillator to the frequency of the transmitter oscillator.

This carrier-recovery mechanism must be able to ignore variations in the carrier phase that are due to the information encoded into the carrier. That is, changes in the phase of the carrier by multiples of 90 degrees must not be interpreted as a drift in the receiver oscillator's frequency. U.S. Pat. No. 6,097,768 shows a phase detector for carrier recovery in a DQPSK receiver. It shows using simple arithmetic operations to measure phase errors in the carrier-recovery mechanism for a DQPSK digital communications receiver. The carrier-recovery mechanism is a feedback loop that provides a synchronization between the oscillators in the transmitter and receiver of the communications system. The phase detector measures deviations from this synchronization and generates a phase-error signal used in the feedback loop to synchronize the oscillators. To perform this measurement, the phase detector takes the received signal as input and compares it against a local oscillator in the receiver to generate two digital signals: the in-phase (I) and quadrature-phase (Q) components of the received signal. These signals are the input to a logic unit, which uses these two signals to determine the phase-error signal. In one embodiment of the phase detector, the logic unit analyzes the signs of the two digital signals and then accordingly adds or subtracts the I and Q signals to generate the phase-error signal. In another embodiment, the logic unit determines the magnitude of the phase-error signal by finding the difference in magnitudes of the two digital signals and constructing a phase-error signal proportional to this difference. The logic unit then determines the sign of the phase-error signal by analyzing the signs of the I and Q digital signals. The logic unit thus uses simple arithmetic operations to generate the phase-error signal, thereby reducing the complexity and cost of the phase detector.

In an optical DQPSK system it is possible to avoid regenerating a carrier in the receiver. United States Patent Application 20040141222 shows an optical phase multi-level modulation method and apparatus, and error control method. It uses a plurality of phase modulators disposed in series to phase-modulate light from a source laser. By using two phase-modulators connected in series to effect phase modulation, the frequency bandwidth required by the phase modulators is half that required in the case of phase modulation using a single phase modulator, so the phase modulator configuration can be simplified. At the receiver a demodulator splits the received lightwave along two pairs of optical paths, a one-bit delay is imparted to the light on a first path, and light on a second path is phase-shifted 45 degrees, and delay detection is effected by combining the light of these two paths. The same is done to the third and fourth paths, but there is a phase difference of 90 degrees between the phase-shift amounts imparted by the phase-shifters. Next, the light is converted to an electric signal by a balanced detector to demodulate the I- and Q-component signals. The absolute amount of the phase-shift is an arbitrary value and should be set from the standpoint of convenience and simplicity of the system apparatus.

United States Patent Application 20040081470 shows an optical communications method of transmitting a plurality n data streams comprising modulating an optical carrier using differential M-ary phase shift key (DMPSK) signaling in which M=2$^n$. Advantageously the method comprises using differential quaternary phase shift keying in which n=2. Since the data is differentially encoded in the form of phase changes rather than absolute phase values this enables the modulated optical carrier to be demodulated using direct detection without requiring a phase-locked local optical oscillator. Optical DQPSK is said to provide a higher tolerance to chromatic dispersion and a higher tolerance to polarization mode dispersion, and the electrical and opto-electronic components operate with a bandwidth commensurate with half the line bit rate. Compared to coherent QPSK, optical DQPSK provides improved tolerance to cross-phase modulation (XPM) since the signal is differentially encoded as a phase difference (change) between successive data bits whilst XPM will in general be common to successive data bits. Since optical DQPSK does not require a phase-coherent local oscillator for demodulation this eliminates the need for adaptive polarization control. Since modulation and demodulation for optical DQPSK is functionally relatively straightforward it can readily be implemented using robust and compact electro-optic circuits such as phase modulators, optical couplers, splitters etc which can be readily integrated in the form of monolithic waveguide devices. The demodulator comprises an optical splitter for splitting the received DQPSK modulated optical signal into two parts which are each applied to a respective unbalanced Mach-Zehnder interferometer (MZI) fabricated in gallium arsenide or lithium niobate. A respective balanced optical to electrical converter is connected across the optical outputs of each MZI. Each MZI is unbalanced in that each has a time delay of approximately one symbol period (50 ps for a 20 Gsymbol/s line rate) of the data modulation rate, in one arm relative to that of the other arm, by making the physical length of one arm longer than that of the other arm. Each MZI is respectively set to impart a relative phase shift of $\pi/4$ and $-\pi/4$ by the application of an appropriate voltage to electrodes on either arm or a differential voltage. Other means of setting the MZIs can also be used.

However the operating point of the interferometer changes with time owing to transmitter and/or receiver characteristics. It is known to provide phase control to maintain the optimum operating point by controlling the path length difference in an interferometer-based optical DQPSK receiver. This control can be based on minimization of the power in the signal at the output of a differential detector. As the phase drifts away from the phase for maximum opening of the receiver "eye", the received intensity tends to increase for two of the four data points and tends to decrease for the other two. On average there should be an increase in total RF power, and so the control can adjust the phase to minimize the RF power to maintain receiver eye opening at a maximum. However, the sensitivity of the control signal is low because the difference between maxima and minima is small and because the rate of change of the control signal is low or zero at the optimum operating point. Thus, the control signal is easily swamped by spurious noise and other effects. This gives a weak drive to the control loop so that the operating point is prone to error. No other simple method of setting the operating point is known.

The problem is exacerbated in optical systems, as opposed to radio DQPSK systems, because the carrier frequencies used are of the order of 10$^4$ times higher. Thus, to maintain the required phase difference between the two paths of the interferometer requires a highly sensitive control loop.

SUMMARY OF THE INVENTION

It is an object of the present invention to provide improved apparatus and methods.

According to a first aspect of the present invention, there is provided an optical receiver for receiving an optical differential phase shift keyed signal, the receiver comprising an optical component sensitive to the optical phase of the received signal, a device arranged to generate a control signal by non linear limiting of an output of the optical component, and a phase controller for tuning a phase response of the optical component to the received signal, wherein the controller is arranged to carry out the tuning according to the control signal.

Advantageously, the receiver can provide a more effective and reliable control because the difference between the maxima and minima of the control signal is greater than in conventional approaches and because the rate of change of the control signal at the tuning point is greater than in conventional approaches. This can enable better phase control and so fewer bit errors or larger margins such as power margins for the transmission system.

In one embodiment, the control signal has a peak corresponding to a desired tuning point and the controller is arranged to at least locally maximize the control signal. In another embodiment, the control signal has a trough corresponding to a desired tuning point and the controller is arranged to at least locally minimize the control signal.

In one embodiment, the optical component comprises an interferometer arranged to compare the received signal with a delayed version of the received signal. This is often more practical to implement than alternatives such as comparing the received signal to a locally generated reference optical signal. The phase control can also track thermal variations in interferometer characteristics.

In one embodiment, the device is a RF amplifier arranged to operate in a region near saturation point. In another embodiment, the device is a diode bridge arrangement.

In one embodiment, the receiver comprises a squaring circuit to square the signal from the device. In a further embodiment, the receiver comprises circuitry for filtering a tone from the output of the square law detector. This can help to isolate the wanted tone from other unwanted artifacts of the signal processing, to improve the control.

In one embodiment, the phase controller is arranged to tune the phase response of the optical component at a substantially lower rate than a data rate of the received signal. This helps to remove data dependence.

In one embodiment, the receiver comprises a balanced detector for converting the output of the optical component to an electrical signal. Such balanced detectors can be more efficient in using the available light, especially from the output of interferometers or other optical components having complementary optical outputs.

In one embodiment, the receiver comprises a second optical component sensitive to the optical phase of the received signal, a second device arranged to generate a second control signal by non linear limiting of an output of the second optical component, and a second phase controller for tuning a phase response of the second optical component to the received signal, wherein the second controller is arranged to carry out the tuning according to the second control signal and wherein the phase controllers are arranged to tune the phase responses of the optical components so that there is a relative phase difference of 90° between the optical components. In one embodiment, the phase controllers are arranged to tune the phase responses of the optical components in response to a signal representing an error rate of a data signal derived from the received signal.

Other aspects provide a corresponding method of processing a received optical signal and a corresponding method of offering data communication services over the above receiver apparatus. This latter aspect is a reflection of the fact that value from the apparatus is often derived from the communications services offered over the apparatus, and the parties offering the services, may be different to the parties owning the apparatus, and based in different jurisdictions. In this case the improvements in the apparatus can lead directly to higher value services. Such increased value over the life of the system, could prove far greater than the sales value of the equipment.

Any of the features can be combined with any of the aspects of the invention as would be apparent to those skilled in the art. Other advantages will be apparent to those skilled in the art.

There now follows, by way of example only, a detailed description embodiments of the present invention representing the best mode for implementing the invention known to the inventors in which:

BRIEF DESCRIPTION OF THE DRAWINGS

FIG. 7 shows a graph of conventional control signal versus phase, and FIG. 8 shows a graph of a control signal versus phase for an embodiment of the present invention.

DETAILED DESCRIPTION OF PREFERRED EMBODIMENTS

The embodiments relate to an optical DQPSK receiver which is set to the optimum operating point in terms of the differential phase delay between the two paths through the interferometer on the basis of maximizing a cost function derived from the received signal. The cost function is generated by amplifying the output from a balanced receiver on the output of an interferometer. The gain is sufficient that the amplifier is operating in its non-linear region, i.e. the signal is in compression. The amplifier is followed by a square law detector which in combination with the non-linear characteristic of the amplifier produces a tone at the baud rate of the incoming signal. When the power in the tone is at a maximum, the operating point of the interferometer is correct for the reception of DQPSK (i.e. + or −pi/4).

DQPSK modulation is proposed in combination with the modulation of two polarization states is one way to increase the capacity of Next Generation Modem systems from 10 to 40 Gbit/s. An interferometer-based optical receiver offers a simple method of receiving DQPSK signals as an alternative to a DSP-based receiver and may offer cost and power consumption advantages. The method of controlling the interferometer operating point described here can be more reliable than the alternative of minimizing the received power at the output of the differential detector.

Figure 1:
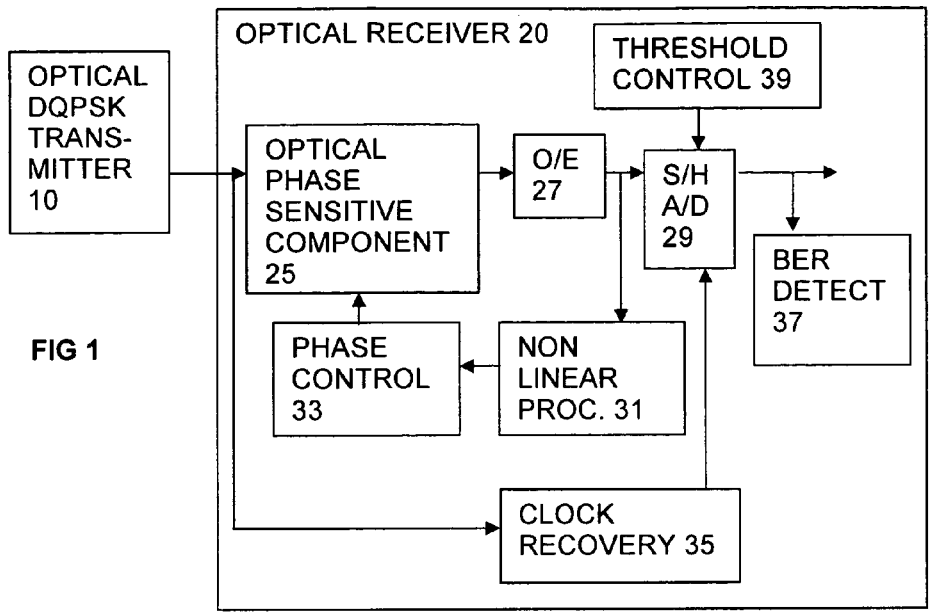
FIG. 1 shows a first embodiment of the invention.

FIG. 1 shows a system including an optical DQPSK transmitter 10, and an optical receiver 20. The receiver has an optical phase sensitive component 25, controlled by a phase controller 33. An output of the component is dependent on the relative phase of the received optical signal, and is fed to the optical to electrical converter 27. The electrical analogue signal is fed to a sample hold and analog to digital converter 29. The digital output can be fed to other processing circuitry which may include an error detector 37 which can output a bit error rate. The phase controller has a control signal as an input, which is generated by a non linear processing element 31. This uses an output of the optical component, typically after conversion to electrical form. A clock recovery circuit 35 is also shown, taking the received optical signal as an input. This clock is used by the sample hold part 29.

Figure 2:
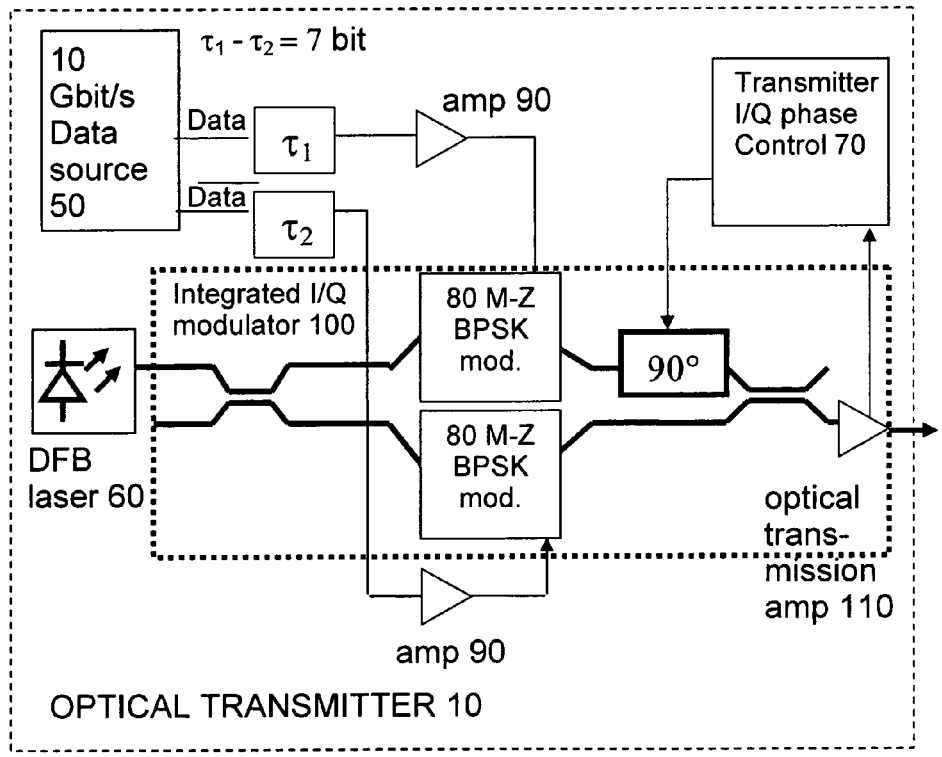
FIG. 2 shows a transmitter for a DQPSK system.

FIG. 2 shows a typical DQPSK transmitter, and shows a data source 50, feeding delay elements $\tau_1$ and $\tau_2$ with data and inverted data. Amplifiers 90 feed the data signals to an integrated modulator 100. This contains a pair of Mach-Zehnder BPSK modulators 80, arranged in two optical paths fed by an optical source in the form of a DFB laser 60. One path additionally has a 90° phase delay, so as to form I and Q components which are combined and transmitted by optical transmission amplifier 110. I/Q phase control part 70 adjusts the relative delay.

Figure 3:
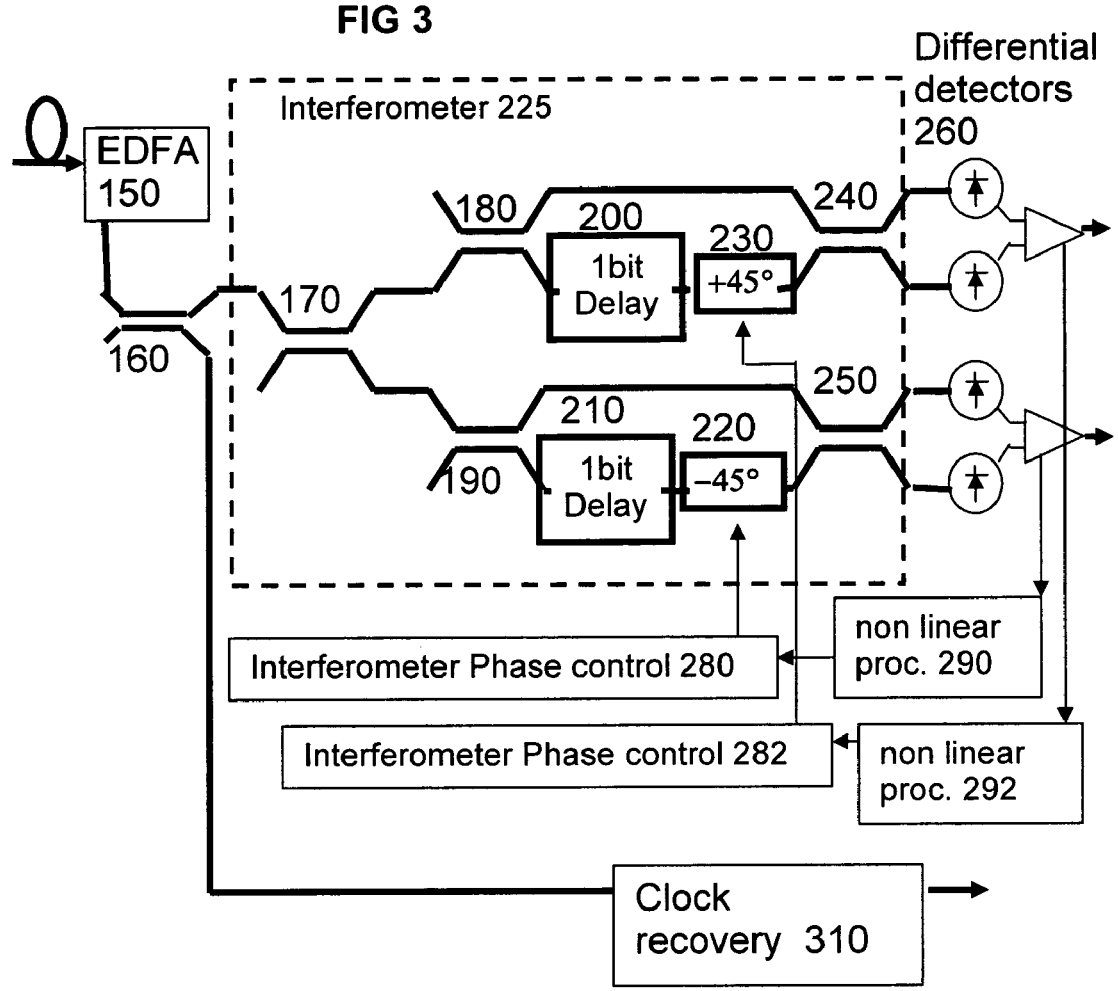
FIG. 3 shows a DQPSK receiver according to another embodiment.

FIG. 3 shows a DQPSK receiver including an optical pre-amplifier in the form of an EDFA 150. This is followed by splitter 160 which feeds a proportion of the optical power for a clock recovery circuit 310. The main part of the optical input is split into four equal parts by splitters 170, 180, 190. A first pair of paths forms one interferometer and is given a differential delay by 1 bit delay 200 and 45° delay 230. The pair is combined again by coupler 240, and the complementary optical outputs are fed to differential detector 260. The same arrangement is provided for the third and fourth optical paths, which form a second interferometer and have a relative delay provided by a 1 bit delay 210 and a −45° delay 220. A coupler 250 feeds another differential detector 260. The outputs of the differential detectors are fed on to other circuitry not shown, and to the non linear processing circuits 290 and 292. These each feed a respective interferometer phase control part 280, 282, which tune the interferometers as will now be explained with reference to FIGS. 4 to 8. Before describing the non linear processing with reference to FIG. 4, the principles of the phase control will be described briefly.

Figure 5:
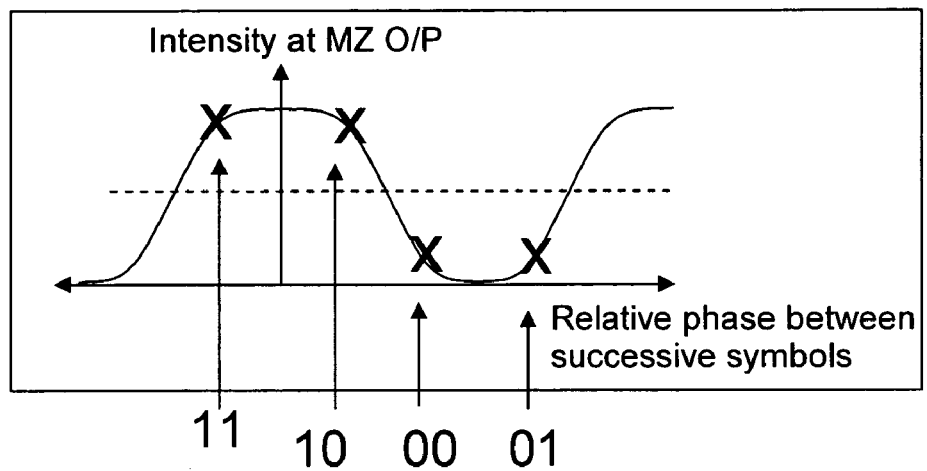
FIGS. 5 and 6 shows graphs of optical output intensity and relative phase for successive symbols for −45° and +45° biased interferometers respectively.
Figure 6:
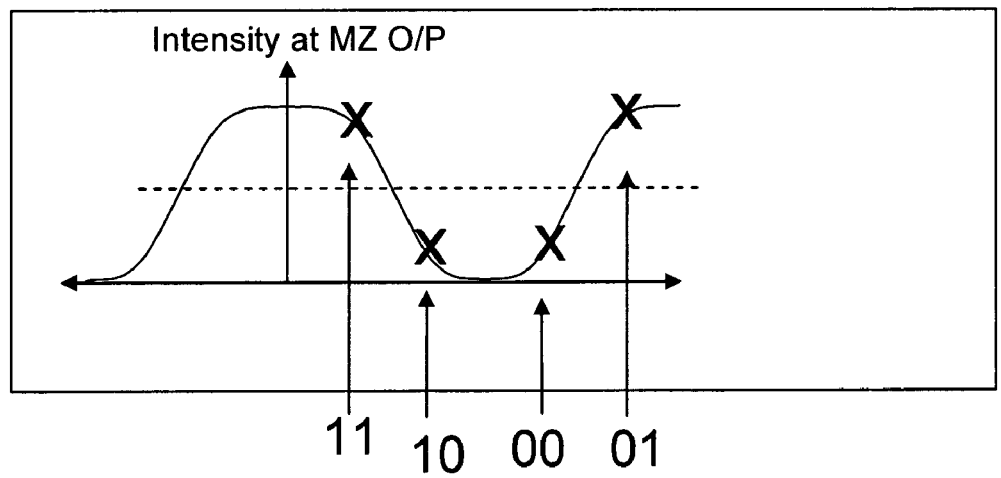

Graphs shown in FIGS. 5 and 6 show an intensity of the output of the interferometers for different relative phases. A dotted horizontal line shows an intensity threshold used to discriminate between ones and zeroes. These graphs show the case where the transmitter has encoded 11=0 deg, 10=90 deg, 00=180 deg and 01=270 deg, relative to the phase of the previous symbol. FIG. 5 can be seen as showing detection of and FIG. 6 showing detection of a second digit ("Q"). If the phase of the received signal drifts out of synchronization, this would be seen in FIGS. 5 and 6 as the sampling points "X" all moving along the solid line to the left or right, with the result that the intensity at the sampling points would no longer be at two intensity levels, but at four levels, two of them closer to the threshold. This means the receiver "eye" becomes more closed, and there is less margin for noise, and more chance of an increased BER.

To keep the eye open, a phase controller can use the detected RF power to set the +45 and −45 degree phase offsets by low speed control loops on basis of detected RF power. The simplest method is to minimize RMS of squared output from differential detectors. FIG. 7 shows how a control signal would vary with phase. There are minima at 45 and 135 degrees corresponding to an open receiver eye. However the minima are not so pronounced that the control is strong enough. FIG. 8 shows a stronger control signal as obtained by embodiments of the invention. This has maxima at 45 and 135 degrees, which are more pronounced and so can give stronger control, especially in a real system with noise and dispersion effects.

Figure 4:
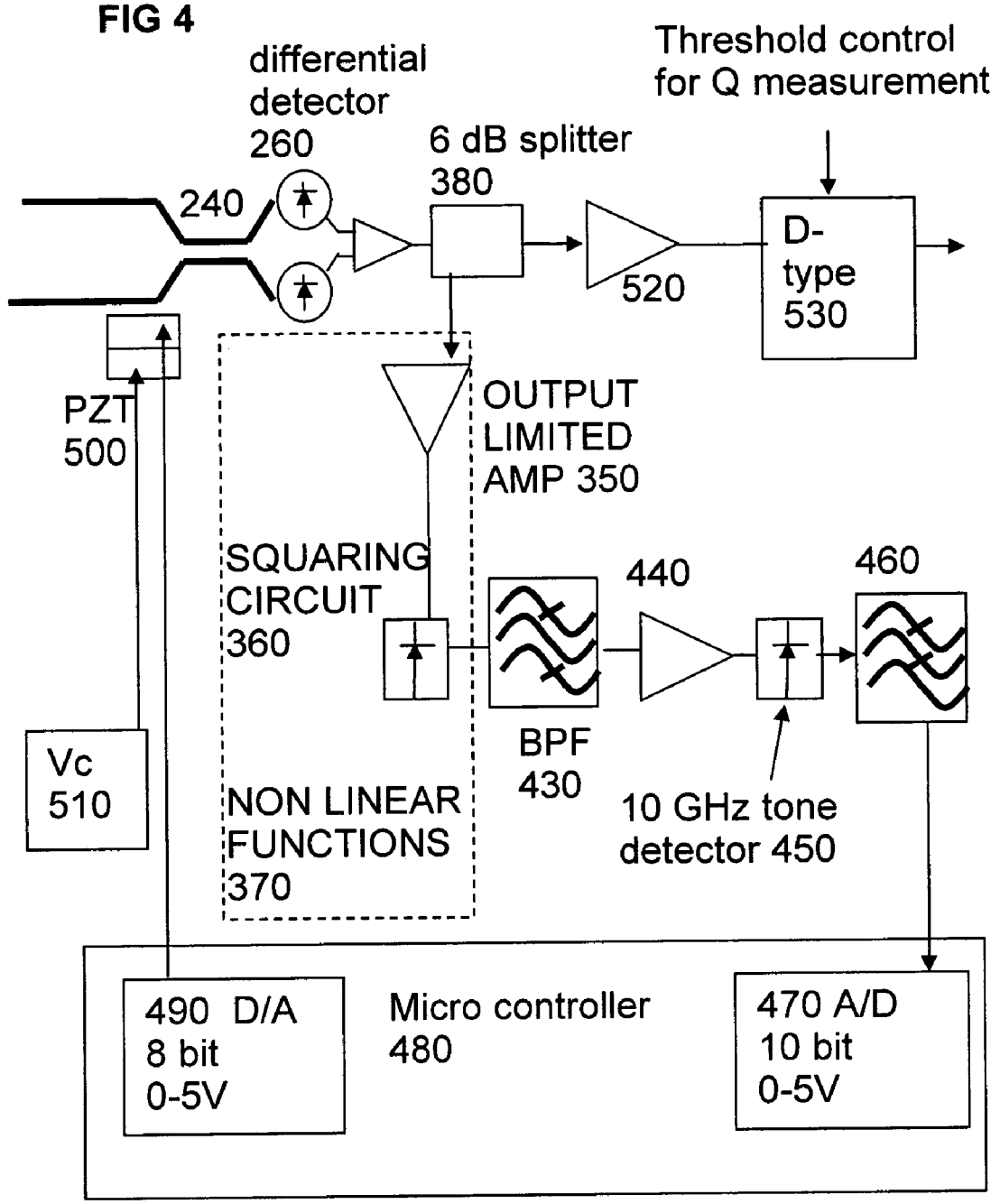
FIG. 4 shows non linear circuitry and a phase controller for the embodiment of FIG. 3.

An embodiment providing an example of how to obtain such a control signal is shown in FIG. 4. Optical paths in one of the interferometers show a relative delay controlled by a PZT 500. The paths are combined by coupler 240 and fed to detector 260. A proportion of the detector output signal is fed to non linear functions 370. The main signal is fed to other circuitry such as amplifier 520 and sample hold circuitry in the form of a D-type latch 530. The non linear functions include an output limited amplifier 350 operating in a saturated region, and a squaring circuit 360. A filtering circuit in the form of a BPF 430 set at the 10 GHz transmission bit rate, is followed by an amplifier 440, a tone detector 450 for detecting a 10 GHz tone. An envelope detector in the form of a low pass filter 460 amplifies the signal fed to a phase controller in the form of a microcontroller 480. This includes an input A/D convertor 470 and an output D/A convertor 490. The controller tunes the PZT 500. A constant offset voltage to set an operating point is provided by supply Vc 510.

In an alternate embodiment, the non linear function is provided by a diode bridge arrangement.

PZTs can be replaced by differential control of the DQPSK interferometer arms. Both give good extinction, but differ in time constant of control of delay. Temperature control time constant is typically 250 ms, a PZT control time constant is typically 1 ms. To control relative phase between two arms of fiber interferometer to 45 degrees (modulo 2 π)+/−3 degrees, and for a 100 ps path difference, 3 degrees corresponds to a change in laser transmit frequency of 100 MHz. Variation of this order is observed with a period in the order of seconds. FIG. 4 shows an analogue control loop using a lock-in amplifier to control PZT. The controller can take the form of a digital gradient ascent perturbation processor programmed into the microcontroller. The D/A resolution can be 255 LSB representing 0-5V, the PZT can have 6.5V between open eye points (90 deg), so 1 LSB corresponds to 0.27 degrees. The Perturbation range can correspond to +/−6 LSB. The weight can be updated 1 LSB in direction of increasing power 16 times per second for example.

In the receiver of FIG. 3, the phase controllers 280, 282 operating as described above may latch onto components of the DQPSK signal other than the correct I and Q components. Each Mach-Zehnder BPSK modulator 80 may latch onto one of four different operating points, thus giving a total of 16 different combinations. To ensure that the phase controllers latch onto the desired combination, the phase controllers 280, 282 may be controlled in response to a determined bit error rate (BER) of a data signal derived from the received optical DQPSK signal. When the BER is high, the phase controllers 280, 282 are may be reset so that they may latch onto another component. In this way, the phase controllers may be cycled through possible combinations until the desired I and Q components are correctly received as indicated by a low BER. This process need only be performed once upon start up of the receiver and is expected to take in the order of milliseconds to perform.

One skilled in the art will readily appreciate that modifications of the described embodiments and further embodiments are encompassed within the spirit and scope of the present invention which is defined by the accompanying claims.

The invention claimed is:

1. An optical receiver for receiving an optical differential phase shift keyed signal, the receiver comprising
    an optical component sensitive to the optical phase of the received signal,
    a device arranged to generate a control signal from an output of the optical component,
    a squaring circuit for squaring the control signal from the device;
    circuitry for filtering a tone from the output of the squaring circuit; and
    a phase controller for tuning a phase response of the optical component to the received signal,
    wherein the controller is arranged to carry out the tuning according to the control signal.

2. An optical receiver according to claim 1, wherein the control signal has a peak corresponding to a desired tuning point and the controller is arranged to at least locally maximize the control signal.

3. An optical receiver according to claim 1, wherein the control signal has a trough corresponding to a desired tuning point and the controller is arranged to at least locally minimize the control signal.

4. An optical receiver according to claim 1, wherein the optical component comprises an interferometer arranged to compare the received signal with a delayed version of the received signal.

5. An optical receiver according to claim 1, wherein the device is a RF amplifier arranged to operate in a region near saturation point.

6. An optical receiver according to claim 1, wherein the phase controller is arranged to tune the phase response of the optical component at a substantially lower rate than a data rate of the received signal.

7. An optical receiver according to claim 1 comprising a balanced detector for converting the output of the optical component to an electrical signal.

8. An optical receiver according to claim 1 comprising:
    a second optical component sensitive to the optical phase of the received signal,
    a second device arranged to generate a second control signal by non linear limiting of an output of the second optical component, and
    a second phase controller for tuning a phase response of the second optical component to the received signal,
    wherein the second controller is arranged to carry out the tuning according to the second control signal and wherein the phase controllers are arranged to tune the phase responses of the optical components so that there is a relative phase difference of 90° between the optical components.

9. An optical receiver according to claim 8, wherein the phase controllers are arranged to tune the phase responses of the optical components in response to a signal representing an error rate of a data signal derived from the received signal.

10. A method of processing an optical differential phase shift keyed signal, the method comprising the following steps:
    inputting the optical signal to an optical component sensitive to the optical phase of the optical signal, and
    generating a control signal from an output of the optical component, squaring the control signal and filtering a tone from the squared control signal; and
    tuning the phase response of the optical component in response to the control signal.

11. A method of operating a telecommunications service using the optical receiver of claim 1.

* * * * *